United States Patent
Hartl et al.

(10) Patent No.: US 9,925,933 B2
(45) Date of Patent: Mar. 27, 2018

(54) PRE-CHARGE QUICK KEY CYCLING PROTECTION

(71) Applicant: Ford Global Technologies, LLC, Dearborn, MI (US)

(72) Inventors: Derek Hartl, Royal Oak, MI (US); Kevin Vander Laan, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1027 days.

(21) Appl. No.: 14/015,180

(22) Filed: Aug. 30, 2013

(65) Prior Publication Data
US 2015/0061376 A1 Mar. 5, 2015

(51) Int. Cl.
*B60R 16/02* (2006.01)
*B60L 1/00* (2006.01)
(Continued)

(52) U.S. Cl.
CPC .............. *B60R 16/02* (2013.01); *B60L 1/003* (2013.01); *B60L 1/02* (2013.01); *B60L 3/0007* (2013.01); *B60L 3/0023* (2013.01); *B60L 3/0046* (2013.01); *B60L 3/04* (2013.01); *B60L 3/12* (2013.01); *B60L 7/14* (2013.01);
(Continued)

(58) Field of Classification Search
USPC ........................................................ 307/9.1
See application file for complete search history.

(56) References Cited

U.S. PATENT DOCUMENTS

| 4,494,162 A | 1/1985 | Eyler |
| 4,901,690 A | 2/1990 | Cummins et al. |

(Continued)

FOREIGN PATENT DOCUMENTS

| JP | 2005295697 A | 10/2005 |
| JP | 2009038925 A | 2/2009 |

(Continued)

OTHER PUBLICATIONS

Chinese Patent Office, First Office Action for the corresponding Chinese Patent Application No. 201410377851.8, dated Dec. 18, 2017.

*Primary Examiner* — Daniel Kessie
*Assistant Examiner* — Xuan Ly
(74) *Attorney, Agent, or Firm* — David Kelley; Brooks Kushman P.C.

(57) ABSTRACT

A vehicle is disclosed comprising a pre-charge circuit, including a resistor, that selectively connects a traction battery to an electrical impedance. A controller is programmed to inhibit pre-charging for an amount of time when a predetermined number of pre-charge cycles have occurred within a preceding predetermined period of time. The predetermined number of pre-charge cycles may be based on a voltage or current magnitude across the resistor during the previous pre-charge cycles. The predetermined number of times may be modified based on prior successful and failed pre-charge cycles. A method of limiting a temperature increase of a pre-charge resistor is disclosed comprising counting a number of prior pre-charge cycles and inhibiting pre-charging when the number of prior pre-charge cycles within the preceding period of time exceeds a threshold.

19 Claims, 3 Drawing Sheets

(51) Int. Cl.
  *B60L 1/02*    (2006.01)
  *B60L 3/00*    (2006.01)
  *B60L 3/04*    (2006.01)
  *B60L 3/12*    (2006.01)
  *B60L 7/14*    (2006.01)
  *B60L 11/00*   (2006.01)
  *B60L 11/14*   (2006.01)
  *B60L 11/18*   (2006.01)
  *B60L 15/00*   (2006.01)

(52) U.S. Cl.
  CPC .............. *B60L 11/005* (2013.01); *B60L 11/14* (2013.01); *B60L 11/1803* (2013.01); *B60L 11/185* (2013.01); *B60L 11/1816* (2013.01); *B60L 11/1861* (2013.01); *B60L 11/1866* (2013.01); *B60L 11/1868* (2013.01); *B60L 11/1877* (2013.01); *B60L 15/007* (2013.01); *B60L 2210/12* (2013.01); *B60L 2210/30* (2013.01); *B60L 2210/40* (2013.01); *B60L 2240/10* (2013.01); *B60L 2240/34* (2013.01); *B60L 2240/36* (2013.01); *B60L 2240/525* (2013.01); *B60L 2240/527* (2013.01); *B60L 2240/529* (2013.01); *B60L 2240/547* (2013.01); *B60L 2240/549* (2013.01); *B60L 2240/662* (2013.01); *B60L 2240/80* (2013.01); *B60L 2250/12* (2013.01); *B60L 2260/22* (2013.01); *B60L 2260/26* (2013.01); *B60L 2270/12* (2013.01); *B60L 2270/20* (2013.01); *Y02T 10/645* (2013.01); *Y02T 10/70* (2013.01); *Y02T 10/7005* (2013.01); *Y02T 10/7022* (2013.01); *Y02T 10/7044* (2013.01); *Y02T 10/7061* (2013.01); *Y02T 10/7066* (2013.01); *Y02T 10/7072* (2013.01); *Y02T 10/7077* (2013.01); *Y02T 10/7233* (2013.01); *Y02T 10/7241* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y10T 307/766* (2015.04)

(56) References Cited

U.S. PATENT DOCUMENTS

| | | | |
|---|---|---|---|
| 7,216,616 | B2 | 5/2007 | Asada et al. |
| 7,479,711 | B2 | 1/2009 | Mack |
| 2013/0116875 | A1* | 5/2013 | Oh ..................... B60L 15/2045 701/22 |
| 2013/0214705 | A1* | 8/2013 | Steck ..................... B60L 3/00 318/139 |
| 2014/0028088 | A1* | 1/2014 | Salziger ................. B60R 16/02 307/9.1 |
| 2015/0035539 | A1* | 2/2015 | Wakida ................ G01R 31/327 324/418 |

FOREIGN PATENT DOCUMENTS

| | | |
|---|---|---|
| JP | 5127387 B2 | 1/2013 |
| JP | 5157193 B2 | 3/2013 |
| KR | 20080047055 A | 5/2008 |

\* cited by examiner

US 9,925,933 B2

PRE-CHARGE QUICK KEY CYCLING PROTECTION

TECHNICAL FIELD

This application relates to pre-charging an electrical load of a vehicle from a traction battery to prevent overheating of pre-charge components due to repeated key cycling.

BACKGROUND

A typical electric or hybrid-electric vehicle derives power for propulsion from a traction battery. During accidents and when power is not required from the traction battery, the terminals of the battery may be disconnected from other components. Isolating the traction battery from the high-voltage bus of the vehicle is typically achieved using a main contactor. The main contactor may be damaged when current flows during closure due to large inrush currents of devices attached to the high-voltage bus. To eliminate closing the main contactor while large inrush currents are present, most systems employ a pre-charge circuit to limit the current flowing to the high-voltage bus at power up. A typical pre-charge circuit may consist of a pre-charge contactor and a resistor.

The resistor of the pre-charge circuit limits the current flow to the high-voltage bus from the traction battery. Once the high-voltage bus reaches a certain voltage, the main contactor may be closed. The main contactor closes with a much smaller voltage across the contactor that reduces current flow which minimizes arcing and possible damage to the main contactor. The pre-charge components are only used during vehicle start up. However, to prevent damage due to rapid on-off cycling of the ignition, pre-charge components may be designed to handle a continuous usage profile.

SUMMARY

A vehicle includes a traction battery, an electrical impedance, a pre-charge circuit including a resistor, and at least one controller. The pre-charge circuit is arranged such that the resistor is selectively connected between the traction battery and the electrical impedance. The controller is programmed to, in response to the resistor being connected a predetermined number of times within a preceding predetermined period of time, inhibit connecting the resistor during a subsequent predetermined period of time in a presence of a request to connect the resistor to limit a temperature increase of the resistor. The predetermined number of times may be based on a magnitude or a duration of a peak magnitude of a current through the resistor during the preceding predetermined period of time. The predetermined number of times may be based on a magnitude or a duration of the magnitude of a voltage across the resistor during the preceding predetermined period of time. As the amp hours discharged by the battery during the preceding predetermined period of time increases, the predetermined number of times may decrease. The predetermined number of times may decrease as a magnitude of the voltage across the resistor exceeds a predetermined overcurrent threshold for a predetermined overcurrent detection time during the preceding predetermined period of time. The predetermined number of times may decrease, when, after a predetermined maximum pre-charge time, a voltage across the electrical impedance fails to approach within a predetermined amount of the voltage across the traction battery during the preceding predetermined period of time.

A method for limiting a temperature increase of a resistor includes the steps of counting a number of times the resistor is connected between a traction battery and an electrical impedance within a predetermined period of time, receiving a request to connect the resistor subsequent to the predetermined period of time, and in response to receiving the request, inhibiting connecting the resistor between the traction battery and the electrical impedance if the number exceeds a predetermined number. The method may further include connecting the resistor in response to receiving the request after another predetermined period of time. The predetermined number may be based on a magnitude of current through the resistor during the preceding predetermined period of time. The predetermined number may be based on a magnitude of voltage across the resistor during the preceding predetermined amount of time. The predetermined number may be based on a duration of a peak magnitude of the voltage across the resistor during the preceding predetermined period of time.

A vehicle includes a pre-charge circuit including a resistor and arranged such that the resistor is selectively connected between a traction battery and an electrical impedance, and at least one controller. The controller is programmed to, in response to a request to connect the resistor, prevent connecting the resistor based on a magnitude of a voltage across the resistor during a predetermined period of time preceding the request. The controller may be further programmed to prevent connecting the resistor based on a duration of a peak magnitude of the voltage across the resistor during the predetermined period of time. The controller may be further programmed to prevent connecting the resistor based on a decrease in magnitude of the voltage across the resistor during the predetermined period of time. The controller may be further programmed to prevent connecting the resistor based on whether a number of connections of the resistor during the predetermined period of time exceeds a predetermined number. The predetermined number may achieve a maximum value when the magnitude of the voltage across the resistor decreases toward zero during a preceding connection of the resistor. The predetermined number may be less than the maximum value when a magnitude of the voltage across the resistor is above a predetermined overcurrent threshold for a predetermined overcurrent time during a preceding connection of the resistor. The predetermined number may be less than the maximum value when the voltage across the resistor remains above a predetermined voltage for a maximum allowed pre-charge time during a preceding connection of the resistor.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
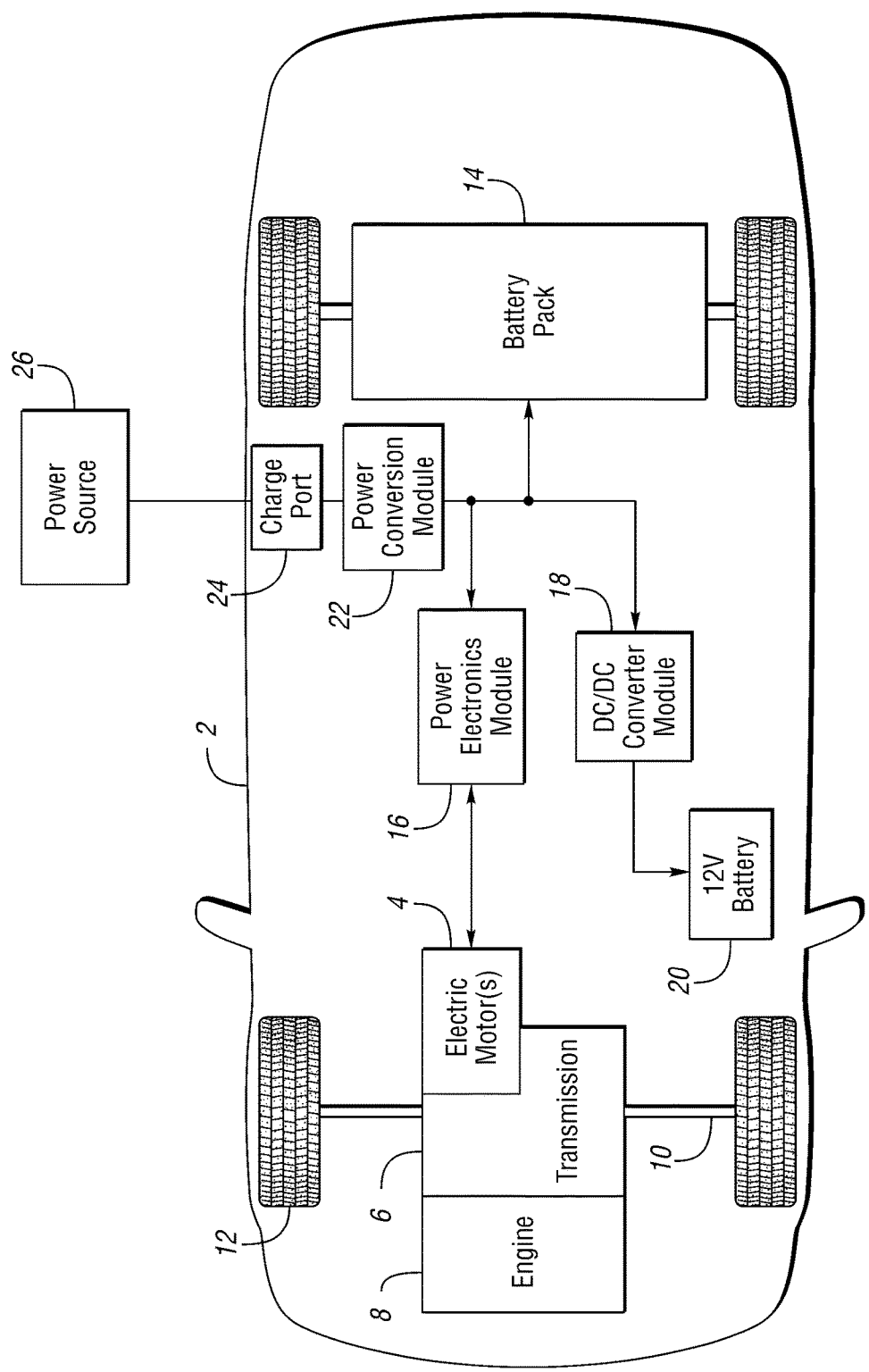
FIG. 1 is a diagram of a plug-in hybrid-electric vehicle illustrating typical drivetrain and energy storage components.

FIG. 1 depicts a typical hybrid-electric vehicle. A typical hybrid-electric vehicle 2 may comprise one or more electric motors 4 mechanically connected to a hybrid transmission 6. In addition, the hybrid transmission 6 is mechanically connected to an engine 8. The hybrid transmission 6 may also be mechanically connected to a drive shaft 10 that is mechanically connected to the wheels 12. The electric motors 4 can provide propulsion and deceleration capability when the engine 8 is turned on or off. The electric motors 4 may also act as generators and can provide fuel economy benefits by recovering energy that would normally be lost as heat in the friction braking system. The electric motors 4 may also provide reduced pollutant emissions since the hybrid electric vehicle 2 may be operated in electric mode under certain conditions.

The battery pack 14 stores energy that can be used by the electric motors 4. The battery pack 14 is often referred to as a traction battery. A vehicle battery pack 14 typically provides a high voltage DC output. The battery pack 14 is electrically connected to at least one power electronics module 16. The power electronics module 16 is also electrically connected to the electric motors 4 and provides the ability to bi-directionally transfer energy between the battery pack 14 and the electric motors 4. For example, a typical battery pack 14 may provide a DC voltage while the electric motors 4 may require a three-phase AC current to function. The power electronics module 16 may convert the DC voltage to a three-phase AC current as required by the electric motors 4. In a regenerative mode, the power electronics module 16 will convert the three-phase AC current from the electric motors 4 acting as generators to the DC voltage required by the battery pack 14. The methods described herein are equally applicable to a pure electric vehicle.

In addition to providing energy for propulsion, the battery pack 14 may provide energy for other vehicle electrical systems. A typical system may include a DC/DC converter module 18 that converts the high voltage DC output of the battery pack 14 to a low voltage DC supply that is compatible with other vehicle loads. Other high voltage loads, such as heaters and compressors, may be connected directly without the use of a DC/DC converter module 18. In a typical vehicle 2, the low voltage systems are electrically connected to a 12V battery 20. An all-electric vehicle may have a similar architecture but without the engine 8.

The vehicle 2 may be a plug-in hybrid in which the battery pack 14 may be recharged by an external power source 26. The external power source 26 may provide AC or DC power to the vehicle 2 by electrically connecting through a charge port 24. The charge port 24 may be any type of port configured to transfer power from the external power source 26 to the vehicle 2. The charge port 24 may be electrically connected to a power conversion module 22. The power conversion module 22 may condition the power from the external power source 26 to provide the proper voltage and current levels to the battery pack 14. In some applications, the external power source 26 may be configured to provide the proper voltage and current levels to the battery pack 14 and the power conversion module 22 may not be necessary. The following description applies equally to any vehicle 2 utilizing a battery pack 14.

Figure 2:
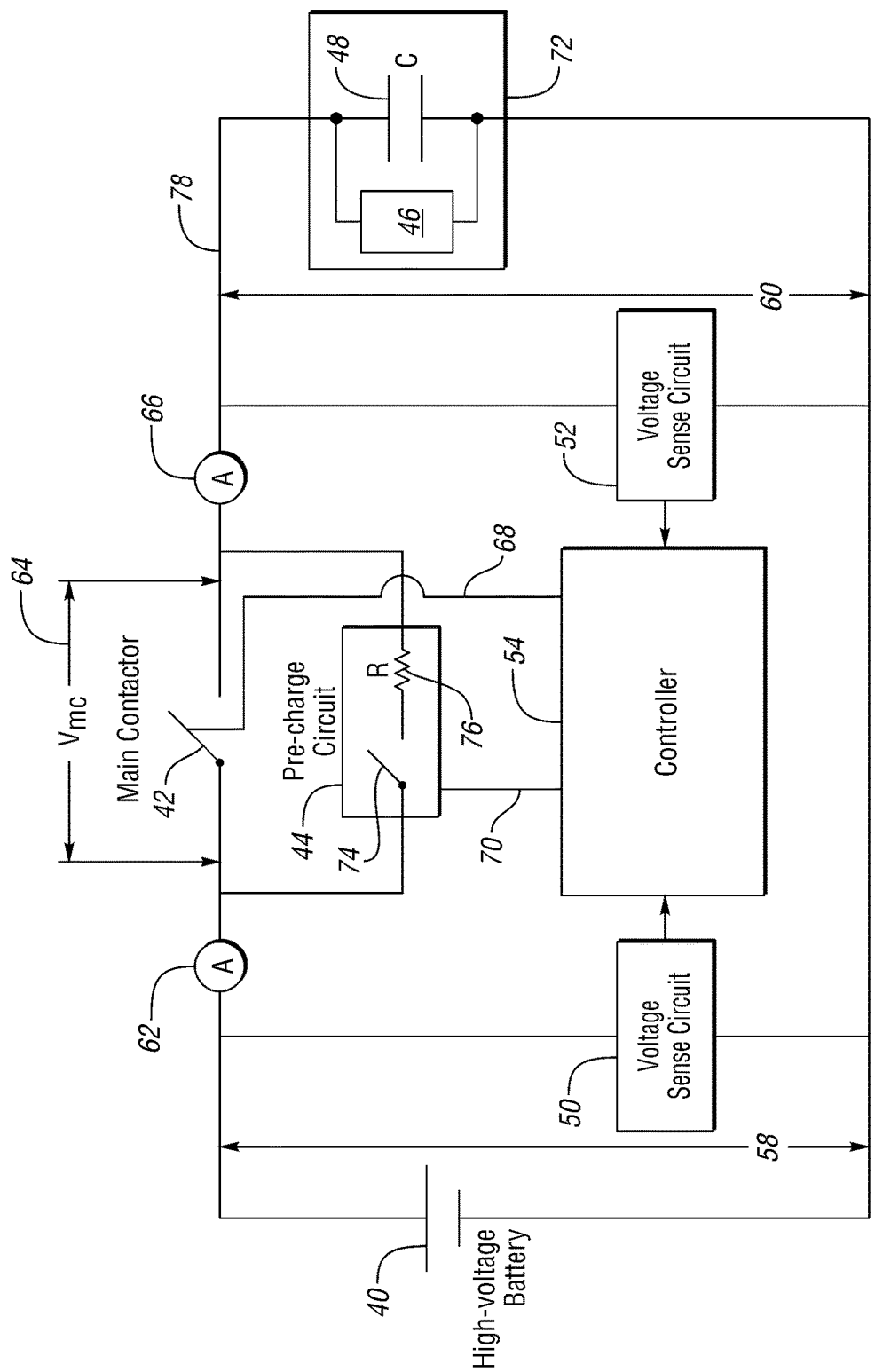
FIG. 2 is a diagram of a possible arrangement for connecting a high-voltage battery pack to electrical loads within a vehicle.

FIG. 2 illustrates one possible high-voltage DC bus control architecture for a vehicle. The high-voltage battery 40 may be of any chemistry, such as NIMH, lead-acid or lithium-ion. The high-voltage battery 40 may be electrically connected to a main contactor 42. The main contactor 42 may default to an open position such that the high-voltage battery 40 is disconnected from a load impedance 72. The load impedance 72 may be represented as having a capacitive 48 portion and a resistive/inductive portion 46. When the main contactor 42 is in the open position, the high-voltage battery 40 cannot provide power to load impedance 72.

A typical electrical impedance 72 in a vehicle will contain some capacitance 48. The impedance 72 may include any devices (e.g., inverters, DC/DC converters, etc.) that are connected to the high-voltage bus. The impedance 72 may be comprised of separate power electronics devices, each having its own capacitance 48 associated with it. The capacitance 48 may actually be comprised of multiple capacitances connected in parallel or series. Capacitance 48 may also be added to smooth and filter the bus voltage. The capacitance 48 may represent an equivalent capacitance for the entire load side of the electrical system. The load impedance 72 represents the total impedance of all modules that may be connected to the high-voltage bus.

A signal or request to close the main contactor 42 may be issued in response to an ignition on request by the driver. The signal to close the main contactor 42 may also be issued in response to a charger being connected. In general, whenever it is required for the high voltage battery 40 to be connected to other devices, a request to close the main contactor 42 may be issued. In cases of a vehicle accident, a request to open the main contactor 42 may be issued to limit high voltage exposure to the vehicle occupants and rescuers. The signals to open and close the main contactor 42 may be received by one or more controllers 54 that control the operation of the main contactor 42 and pre-charge circuit 44. Communication of the open and close signals may be via discrete signal or serial communications bus (e.g., CAN).

The simplest implementation of a main contactor 42 would be a manually operated switch. This type is not used in practice for many reasons. The main contactor 42 may be further comprised of a control mechanism, such as a relay, that can close the contactor 42 when activated. For example, when a relay is energized, it may cause the contactor 42 to move to a closed position and allow current to flow through the main contactor 42. When the main contactor 42 is closed, the high-voltage battery 40 is electrically connected to the electrical impedance 72. When the main contactor 42 is closed, the electrical impedance 72 may draw current from the high-voltage battery 40 through the main contactor 42.

The control mechanism of the main contactor 42 may be connected to a controller 54. For example, a coil of the relay that controls the main contactor 42 may be electrically connected (represented by 68) to the controller 54. The controller 54 may be configured to energize and de-energize the coil to actuate the main contactor 42 to close and open. The controller 54 may also be configured to measure various system voltages. The voltage across the load 60 may be measured using a voltage sense circuit 52 that may be configured to isolate high-voltage from the controller 54 and to scale the voltage 60 to an appropriate level for the controller 54. In a similar manner, the voltage across the high-voltage battery 58 may also be measured. A separate voltage sense circuit 50 may be used to isolate high-voltage from the controller 54 and to scale the voltage 58 to an appropriate level for the controller 54.

Issues may arise when closing the main contactor 42 where there is a voltage across the main contactor 42. The voltage across the main contactor may be denoted as $V_{mc}$ 64. In a typical situation where the capacitance 48 is fully discharged, there may be a large $V_{mc}$ 64 before switching on the main contactor 42. One property of a capacitive load 48 is that the voltage may not change instantaneously. The current through the capacitive load 48, however, may change rapidly. A large inrush current may be created upon switching a high voltage into the capacitive load 48. The large inrush current may cause an arc across the main contactor 42 during switching. This arcing may damage the main contactor 42. Ideally, a means of limiting this arcing is desired.

To minimize arcing of the main contactor 42, a pre-charge circuit 44 may be implemented across the main contactor 42. A typical pre-charge circuit 44 may use a pre-charge contactor 74 in series with a resistance 76, where the resistance 76 is selected to control the amount of current that can flow when the pre-charge contactor 74 is closed. The controller 54 may use the sensed voltages across the load and battery (60 and 58) to determine when to end the pre-charge operation and close the main contactor 42. When the difference between the two voltages (60 and 58) falls below a threshold, the main contactor 42 may be closed.

The pre-charge circuit 44 may be placed in parallel with the main contactor 42. One side of the pre-charge circuit 44 may be electrically connected to the high-voltage battery 40. Another side of the pre-charge circuit 44 may be electrically connected to the electrical impedance 72. A controller 54 may be configured to control the operation of the contactor 74 within the pre-charge circuit 44. Note that the contactor 74 may also be a solid-state switching device. The contactor 74 may also be a relay based contactor as discussed previously for the main contactor 42. The pre-charge circuit 44 may limit the flow of current into the electrical impedance 72 when the high-voltage battery 40 is connected. The controller 54 may provide one or more control signals 70 to control the operation of the pre-charge circuit 44. The control signal 70 may be a signal to control a switching device 74 (e.g., gate drive of a MOSFET, coil of a relay). The desired effect of the pre-charge circuit 44 is to minimize the voltage, Vmc 64, across the main contactor 42 when the main contactor 42 is switched on.

At vehicle start up, the main contactor 42 is initially opened to isolate the battery from a high-voltage bus 78. The high-voltage bus 78 represents the output connection of the main contactor 42 to the high-voltage loads 72 of the vehicle. The driver may initiate a pre-charge cycle by switching on the ignition. An ignition switch input may be monitored by the controller 54 to determine when battery power is needed on the high-voltage bus 78. The ignition on signal may initiate a request for the main contactor 42 to be closed. The request to close the main contactor 42 may initiate a request to close the pre-charge contactor 74 to limit the current flow from the battery 40 to the electrical loads 72 on the high-voltage bus 78. The current through the pre-charge resistor 76 will quickly rise to a peak level determined by the resistance value and will decrease as the voltage across the high-voltage bus 60 rises toward the voltage of the battery pack 58. Once the voltage across the high-voltage bus 60 has achieved a predetermined level, the main contactor 42 may be closed and the pre-charge contactor 74 may be opened. Current may now flow through the main contactor 42.

A vehicle shut down may be initiated by turning off the ignition switch. At vehicle shut down, the loads 72 on the high-voltage bus 78 may be commanded to draw less current. The system may keep the main contactor 42 closed for some time after ignition off to allow for various functions to be completed. Example functions may be battery cell balancing or battery thermal management. At some time after ignition off, the main contactor 42 may be opened to isolate the battery. Some systems may employ a discharge resistor (not shown) connected to ground to ensure that the voltage across the high-voltage bus 60 decays to zero when the main contactor 42 is opened.

As current flows through the pre-charge resistor 76, energy is dissipated as heat in the resistor 76. Whenever the pre-charge contactor 74 is closed, current may flow through the pre-charge resistor 76 and create heat. It is possible that excessive cycling may damage the resistor 76 due to an excessive temperature. A pre-charge resistor 76 may typically be over designed to dissipate more heat than may be required under normal operating conditions. Under normal operating conditions, the pre-charge contactor 74 may be expected to operate once at ignition on followed by a delay before the next required cycling. The delay is typically long enough for the resistor 76 to cool down to near ambient temperature. Once the pre-charge contactor 74 is opened, no more current flows through the resistor 76. For example, the driver starts the vehicle and drives for a period of time before turning the vehicle off. It may be possible to employ a pre-charge resistor 76 designed to handle only the normally expected temperatures. However, to ensure a durable solution, means may be employed to ensure that the temperature does not exceed a damaging level.

Figure 3:
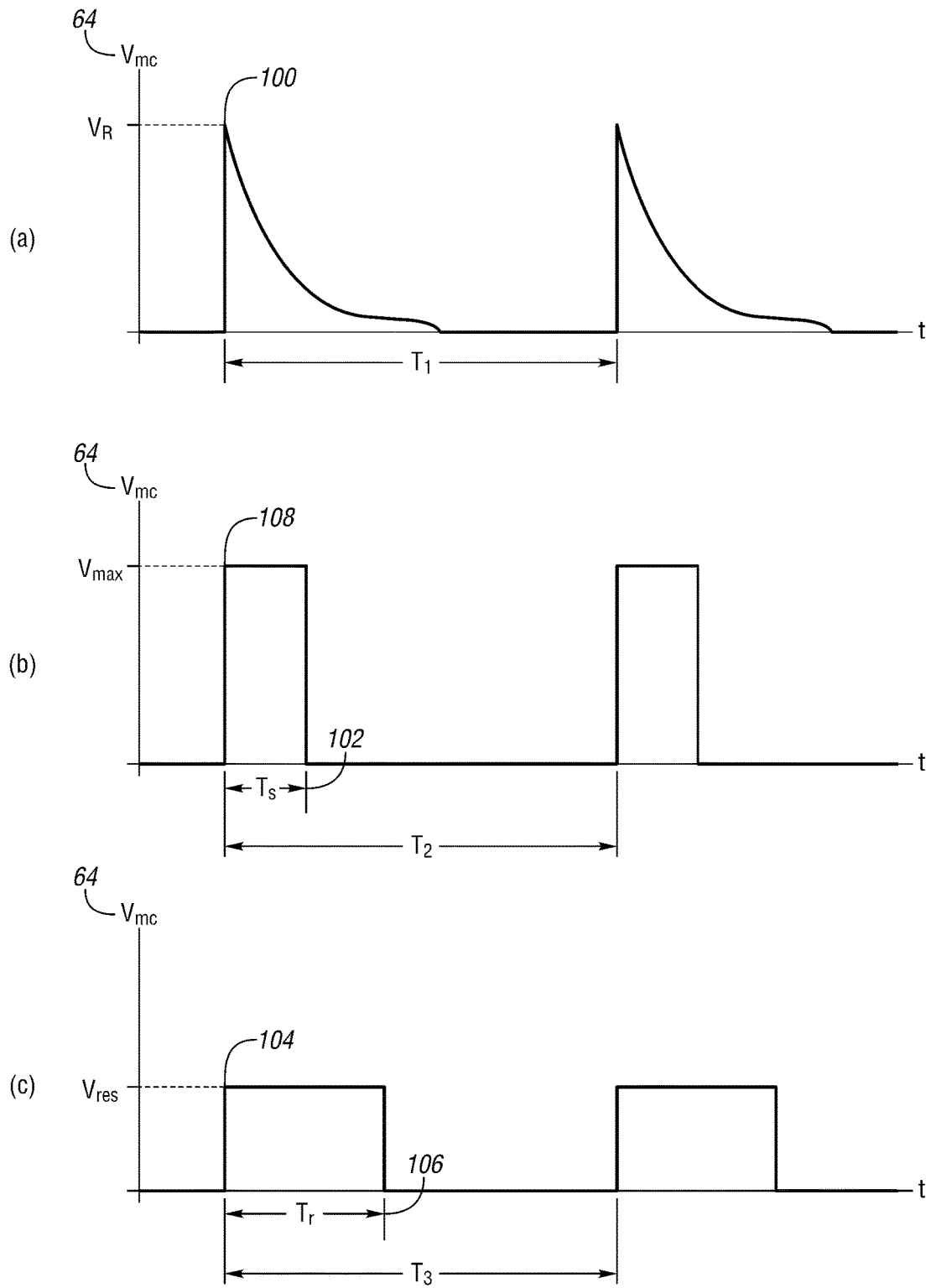
FIG. 3 is a diagram showing possible pre-charge scenarios and the corresponding voltage waveform across the pre-charge circuit.

Unfortunately, there may be conditions where the pre-charge contactor 74 is cycled repeatedly within a short period of time. The cycling of ignition may be implemented as a button which toggles the ignition state of the vehicle. The button may be repeatedly pressed leading to a rapid cycling of the pre-charge contactor 74. FIG. 3(*a*) may represent the voltage waveform across the main contactor/pre-charge circuit (represented by 64) when the pre-charge circuit 44 and load 72 are operating normally. This may represent the case where the high-voltage bus 78 is initially fully discharged. When the pre-charge contactor 74 is closed, current begins to flow to the load 72 through the pre-charge resistor 76. The current is initially a maximum value due to the inrush current of the load 72. The voltage across the pre-charge circuit 64 rapidly increases to a peak value 100 that is a function of the voltage across the battery 58, the voltage across the load 60, and the pre-charge resistor 76 value. As the voltage across the high-voltage load 60 rises, the voltage across the pre-charge circuit 64 decreases. When the voltage across the high-voltage load 60 approaches the battery voltage 58, the main contactor 42 may be closed forcing the voltage across the pre-charge circuit 64 to near zero.

FIG. 3(*b*) may represent the voltage waveform across the main contactor/pre-charge circuit (represented by 64) when the load 72 is shorted to ground. Under this condition, a pre-charge overcurrent fault condition may be detected. In this case, the current through the pre-charge circuit 44 may rise to a maximum value 108 and remain at a nearly constant value. The voltage across the high-voltage bus 78 remains near zero and maximum current flows through the circuit, limited only by the pre-charge resistor 76. The controller 54 may detect this condition by calculating or measuring the current delivered to the load 66, the load voltage 60, or the voltage across the main pre-charge resistor 64. If the measured or calculated value does not rise above a predetermined overcurrent value in a predetermined overcurrent time, $T_s$ 102 or less, the pre-charge operation may be terminated and the pre-charge contactor 74 may be opened. This may represent the worst case thermal load for the pre-charge resistor 76. If a predetermined number of overcurrent faults is detected, further closure attempts of the pre-charge contactor 74 may be inhibited for a predetermined amount of time.

FIG. 3(c) may represent the voltage waveform across the main contactor/pre-charge circuit (represented by 64) when the load 72 is shorted through a non-zero resistance to ground. This may represent a situation where the system fails to pre-charge. In this case, the current through the pre-charge circuit 44 may rise to a maximum value 104 and remain nearly constant at this value. The maximum value 104 in this case may not be as high as the shorted 108 or normal 100 operation case. The voltage across the high-voltage load 60 remains at a non-zero value and current flows through the circuit, limited only by the pre-charge resistor 76 and the resistance of the short. The controller 54 may detect this condition by measuring or calculating the current delivered to the load 66 or by measuring the load voltage 60. If the load voltage 60 does not approach the battery voltage 58 within a predetermined value in a maximum pre-charge time, $T_r$ 104 or less, the pre-charge operation may be terminated and the pre-charge contactor 74 may be opened. Note that the diagrams of FIG. 3 are not necessarily depicted on the same time scale.

One possible method for protecting the pre-charge circuit 44 may be to monitor the number of pre-charge contactor 74 close events within a certain time window. The number of pre-charge contactor 74 close events represents the number of times that the resistor is selectively connected between the traction battery 40 and the electrical impedance 72. Each cycling of the pre-charge contactor 74 may be expected to dissipate a certain amount of energy in the resistor 76. The system may be designed to count the number of consecutive pre-charge contactor 74 close events within a predetermined time interval. The time window may be a moving window that detects the number of pre-charge contactor 74 close events within the last predetermined time interval.

Should the number of pre-charge contactor 74 close events within the given interval exceed a predetermined number, the system may prevent closure of the pre-charge contactor 74 during a subsequent request to close the pre-charge contactor 74. The driver may be temporarily unable to pre-charge the high-voltage bus 78 until a calibrateable timeout period has expired. Further cycling of the pre-charge contactor 74 may be temporarily disabled until the temperature has fallen to an acceptable level. This inhibition of pre-charge contactor 74 closing may protect the pre-charge components (74, 76) from being damaged. The benefit is that pre-charge components (74, 76) may be designed to a lower requirement which results in a cost savings. The protection scheme ensures that pre-charge component (74, 76) are not damaged which reduces vehicle down time and repair costs.

The predetermined number of pre-charge contactor 74 close events may be designed to limit the power through the resistor 76 so that it does not over heat. The number may also be selected to ensure that overheating does not occur in $95^{th}$ percentile customer usage assumptions.

The predetermined number of pre-charge contactor 74 close events may depend on the conditions detected during previous pre-charge events. The system may detect whether the pre-charge event was normal or if a failure condition was present. When normal operation is detected during previous closure events, the predetermined number of closures may be set to a maximum value. Normal operation may be as depicted in FIG. 3(a). When failure conditions are detected during previous closure events, the predetermined number of closures may be set to less than the maximum value.

The detection of whether the previous pre-charge event was normal or failed may depend on the behavior of a current or voltage. The determination may depend on the magnitude of the voltage across 64 or the current through the pre-charge resistor 76. The detection may also be based on a peak magnitude of the voltage across 64 or the current through the pre-charge resistor 76. Additionally, the duration of the magnitude or peak magnitude may be considered. The determination may be based on the voltage across the load 60 and the voltage across the traction battery 58.

For example, the load 72 on the high-voltage bus 78 may be shorted to ground (response depicted in FIG. 3(b)). In this situation, a large current may be observed as the load 72 is not limiting current. In addition, the voltage of the high-voltage bus 60 may not be increasing, so current may maintain a high value without decaying. In this situation, it may be desirable to allow fewer pre-charge contactor 74 close events within an interval to protect the components. In general, as more power is dissipated in the resistor 76 during previous events, a fewer number of cycles may be allowed.

As another example, there may be a resistive short on the load circuit 72 (response depicted in FIG. 3(c)). This may result in a current or voltage profile that is nearly constant during the pre-charge interval. The voltage across the high-voltage bus 60 may not achieve the battery voltage as a voltage divider network is present. The effect is that the pre-charge event may run for a maximum pre-charge time before turning off. In this situation, it may be desirable to allow fewer pre-charge contactor 74 close events within an interval to protect the components. In general, as the amp hours discharged by the battery during the preceding predetermined period of time increases, the predetermined number of times may be decreased to protect the resistor.

The controller 54 may implement logic to inhibit closing the pre-charge contactor 74. A count may be maintained whenever the pre-charge contactor 74 is closed. Each closure of the pre-charge contactor 74 may be saved with a time stamp indicating the time of the closure. The controller 54 may generate an absolute time or receive an absolute time from another module. The time stamp may be a sample of the current absolute time value. The pre-charge contactor 74 closure data may be examined to determine if the time stamp is within the last predetermined amount of time. If the time stamp is within the last predetermined amount of time, the counter may be incremented. Closures that occurred earlier than the last predetermined amount of time may be eliminated from the count. Pre-charge contactor closure time stamps may be stored in non-volatile memory to be retained when the controller 54 has been turned off.

In addition, to the time stamp, an indication of the status of the associated pre-charge closure may be stored. The status may indicate whether the associated pre-charge closure was normal, not successful, or an overcurrent was detected. The maximum number of allowed pre-charge contactor 74 closures within the predetermined time interval may depend on the status of the previous closures. For example, if the pre-charge occurred normally, then a maximum of 25 events may be allowed in the interval. If the pre-charges were not successful, then a maximum of 5 events may be allowed in the interval. If an overcurrent was detected, then a maximum of 3 events may be allowed in the interval. Other examples of implementing the count mechanism are possible.

The status of the pre-charge operation may be ascertained by monitoring voltages or currents associated with the pre-charge resistor 76. A voltage across the pre-charge resistor may be measured directly or calculated as the difference between the voltage across the high-voltage battery 40 and the voltage across the load 60. Likewise, a current through the pre-charge resistor may be calculated by dividing the voltage across the pre-charge resistor 64 by the resistance value. Additionally, the magnitude of the voltage or current associated with the pre-charge resistor may be monitored over time to determine relative behavior such as a decreasing or increasing response. Additionally, a peak magnitude of the voltage or current associated with the pre-charge resistor 76 may be detected and used for determining the status of the pre-charge operation. The duration of the peak magnitude may also be used by measuring the time that the peak magnitude is present.

In the event of inhibiting pre-charge closures, a predetermined time to inhibit pre-charge events may be selected. The inhibition time may be selected to ensure that the resistor temperature has fallen to a level such that the resistor 76 is not damaged by further pre-charge cycles. The inhibition time may be a predetermined number based on test or simulation results. The inhibition time may also be based on the number of previous pre-charge closure events and the status of those previous pre-charge events. For example, a large number of pre-charge closure events may indicate that a user is cycling ignition with no intention of driving, therefore, a longer inhibition time may be appropriate. Additionally, if the previous closure events indicate an overcurrent situation then the inhibition time may be longer to protect the pre-charge resistor 76 as well as the electrical load that is causing the short condition.

The predetermined amount of time in which to count the pre-charge closure events may be selected based on testing or simulation results. The predetermined interval and the number of closures allowed may be selected to protect the pre-charge resistor 76 from excessive temperatures. The allowable number of attempts and the time interval may be determined per vehicle and may depend on the pre-charge circuit components that are selected.

The number of pre-charge contactor 74 closures may be compared to a predetermined value. If the number is greater that the predetermined value, closing of the pre-charge contactor 74 may be disabled for a period of time to allow the pre-charge resistor 76 to cool down. After the disable time period has expired, additional pre-charge contactor 74 closures may be permitted.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    a traction battery;
    an electrical impedance;
    a pre-charge circuit including a resistor and arranged so that the resistor is selectively connected between the traction battery and the electrical impedance; and at least one controller programmed to, in response to the resistor being connected a predetermined number of times within a preceding predetermined period of time, inhibit connecting the resistor during a subsequent predetermined period of time in a presence of a request to connect the resistor to limit a temperature increase of the resistor, wherein the predetermined number of times decreases as an amp hours discharged by the traction battery during the preceding predetermined period of time increases.

2. The vehicle of claim 1 wherein the predetermined number of times is based on a magnitude of a current through the resistor during the preceding predetermined period of time.

3. The vehicle of claim 2 wherein the predetermined number of times is based on a duration of a peak magnitude of the current through the resistor during the preceding predetermined period of time.

4. The vehicle of claim 1 wherein the predetermined number of times is based on a magnitude of a voltage across the resistor during the preceding predetermined period of time.

5. The vehicle of claim 1 wherein the predetermined number of times is based on a duration of a magnitude of a voltage across the resistor during the preceding predetermined period of time.

6. The vehicle of claim 1 wherein as a magnitude of a voltage across the resistor exceeds a predetermined overcurrent threshold for a predetermined overcurrent detection time during the preceding predetermined period of time, the predetermined number of times decreases.

7. The vehicle of claim 1 wherein, after a predetermined maximum pre-charge time, a voltage across the electrical impedance fails to approach within a predetermined amount of the voltage across the traction battery during the preceding predetermined period of time, the predetermined number of times decreases.

8. A method for limiting a temperature increase of a resistor comprising:
    counting a number of times the resistor is connected between a traction battery and an electrical impedance within a predetermined period of time;
    receiving a request to connect the resistor subsequent to the predetermined period of time; and
    in response to receiving the request, inhibiting connecting the resistor between the traction battery and the electrical impedance when the number exceeds a predetermined number that changes based on a voltage magnitude across the resistor and is a maximum value when the voltage magnitude decreases toward zero during a preceding connection of the resistor.

9. The method of claim 8 further comprising connecting the resistor in response to receiving the request after another predetermined period of time.

10. The method of claim 8 wherein the predetermined number is based on a magnitude of current through the resistor during the predetermined period of time.

11. The method of claim 8 wherein the predetermined number is based on a duration of a peak magnitude of the voltage across the resistor during the predetermined period of time.

12. A vehicle comprising:
    a pre-charge circuit including a resistor and arranged so that the resistor is selectively connected between a traction battery and an electrical impedance; and
    a controller programmed to, receive a request to connect the resistor, and prevent connecting the resistor responsive to a number of connections during a predetermined time preceding the request exceeding a predetermined number that varies as a peak voltage magnitude across the resistor changes during the predetermined time.

13. The vehicle of claim 12 wherein the controller is further programmed to vary the predetermined number based on a duration of a peak voltage magnitude during the predetermined time.

14. The vehicle of claim 12 wherein the controller is further programmed to vary the predetermined number based on a decrease in a voltage magnitude across the resistor during the predetermined time.

15. The vehicle of claim 12 wherein the predetermined number achieves a maximum value when a voltage magnitude across the resistor decreases toward zero during a preceding connection of the resistor.

16. The vehicle of claim 15 wherein the predetermined number is less than the maximum value when the magnitude across the resistor is above a predetermined overcurrent threshold for a predetermined overcurrent time during a preceding connection of the resistor.

17. The vehicle of claim 15 wherein the predetermined number is less than the maximum value when the magnitude of the voltage across the resistor remains above a predetermined voltage for a maximum allowed pre-charge time during a preceding connection of the resistor.

18. The method of claim 8 wherein the predetermined number is less than the maximum value when the voltage magnitude across the resistor is above a predetermined overcurrent threshold for a predetermined overcurrent time during a preceding connection of the resistor.

19. The method of claim 8 wherein the predetermined number is less than the maximum value when the voltage magnitude across the resistor remains above a predetermined voltage for a maximum allowed pre-charged time during a preceding connection of the resistor.

* * * * *